Figure 1:
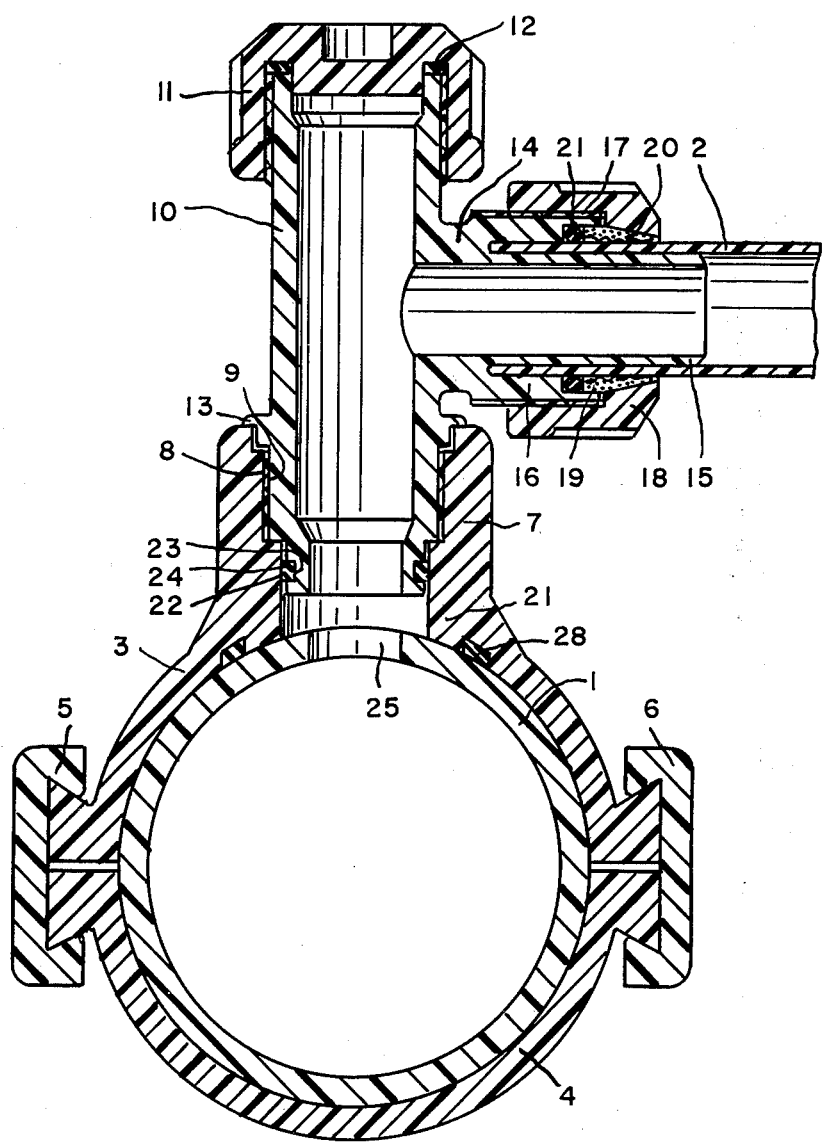

United States Patent [19]

Acda et al.

[11] 4,018,464
[45] Apr. 19, 1977

[54] TAPPING TEE

[75] Inventors: Petrus Marinus Acda, Enkhuizen; Hans Edward Guitoneau, Bovenkarspel, both of Netherlands

[73] Assignee: Polva-Nederland B.V., Netherlands

[22] Filed: Sept. 5, 1975

[21] Appl. No.: 610,567

[30] Foreign Application Priority Data

Sept. 17, 1974 Netherlands ............... 7412287

[52] U.S. Cl. .............................. 285/197; 285/421; 285/180
[51] Int. Cl.² .......................................... F16L 5/00
[58] Field of Search ................. 285/197, 309–312, 285/198, 199, 342, 331, 354, 286, 21, 180, DIG. 19, 421, 114

[56] References Cited

UNITED STATES PATENTS

| 3,834,743 | 9/1974 | Strybel | 285/331 X |
| 3,918,748 | 11/1975 | Acda | 285/197 X |
| 3,920,268 | 11/1975 | Stewing | 285/21 |

Primary Examiner—G. V. Larkin
Attorney, Agent, or Firm—Frank R. Trifari; David R. Treacy

[57] ABSTRACT

Tapping tee for a main pipe having integral coupling means for coupling to branch pipes made of flexible or relatively inflexible synthetic materials. A branch-receiving socket has a support pipe fitting snugly inside the branch pipe, and an integral sleeve having a part fitting snugly to the branch pipe outside, and a part with an enlarged bore for a sealing means.

2 Claims, 2 Drawing Figures

TAPPING TEE

The invention relates to a tapping tee for connecting a main pipe to a branch pipe, which tee comprises a saddle-shaped part, a tubular tapping member which is connected to the saddle-shaped part so as to be rotatable about an axis at right angles to the main pipe and is provided with a branch receiving socket for coupling a branch pipe to the main pipe.

Such tapping tees are used for coupling so-called service pipes to main pipes. The fluid transported through the pipes may be a gas or water. The main pipes and the tubular tapping member may be made of a synthetic resin material, such as polyvinylchloride or polyethylene.

The connections commonly used in practice between the branch-receiving socket of the tapping tee and the service pipe are comparatively rigid. This need not be a disadvantage if the branch service pipe is made of a flexible synthetic resin material. In the case of soil subsidence and the like no stresses which may cause cracking will be produced in the piping. If, however, branch pipes made of rigid, less flexible synthetic resin materials are used, steps must be taken to avoid such stresses. These steps may consist in the use of bends which are undetachably and rotatably connected to the branch pipe. Hence in practice various tapping tees are required having component parts which are not interchangeable.

It is an object of the present invention to avoid the consequent disadvantages by providing a tapping tee capable of universal application.

According to the invention this is achieved by a tapping tee which is characterized in that the branch-receiving socket of the tubular tapping member is provided with coupling members which are integral with the branch-receiving socket and comprise a support pipe having an outer diameter which corresponds to the inner diameter of the branch service pipe and a sleeve which is arranged coaxially with the support pipe and the inner diameter of at least a portion of which corresponds to the outer diameter of the branch service pipe, the outer surface of the sleeve being provided with screw thread for the provision of a nut, while the distal end of the sleeve has an enlarged bore having a diameter and a length sufficient to receive at least a portion of a wedge-shaped retainer on the branch pipe to be coupled to the main pipe. The wedge-shaped retainer on the branch pipe may be formed by mounting an internally toothed wedge ring on the branch pipe. This arrangement is used, for example, with branch pipes made of a flexible synthetic resin material such as polyethylene. Alternatively the branch pipe may be formed with an externally wedge-shaped retaining projection, for example by inflating the pipe end in a suitable die after heating. The latter form is used in branch pipes made of a less flexible synthetic resin material such as PVC. For a branch pipe made of a deformable material, such as polyethylene, a wedge-shaped retainer ring alone may produce sufficient sealing. Preferably, however, a separate sealing member is mounted in the increased-diameter portion of the sleeve.

The support pipe serves to support the branch pipe. Because the end of the branch pipe is enclosed in the sleeve in contact with the support pipe, pressure may be exerted on it via the nut, the wedge-shaped retainer on the branch pipe and the sealing member, if any, without the likelihood that when a branch pipe is used which is made of a synthetic resin material which creeps under pressure, such as polyethylene, leakages will occur after some time.

As a result the tapping tee according to the invention is suitable for coupling a branch pipe made of a flexible synthetic resin material, such as polyethylene, or of a less flexible synthetic resin material, such as polyvinyl chloride, to a main pipe. The tubular tapping member and the branch-receiving socket integral with it preferably consist of a less flexible synthetic material, such as polyvinylchloride, but may as well be made of metal.

The sealing member may be a ring, such as an O-ring, made of an elastically compressible material, such as synthetic or natural rubber.

The tapping tee according to the invention provides the advantage that the coupling to the branch pipe is capable of withstanding tensile stresses and is detachable and, when detached, capable of being simply mounted again. Another advantage is that, in the case of a branch pipe made of a less flexible material, relative vertical displacements of the main pipe and the branch pipe can be taken up by the use of a bend, the branch-receiving socket extending in a direction substantially parallel to the main pipe.

Figure 2:
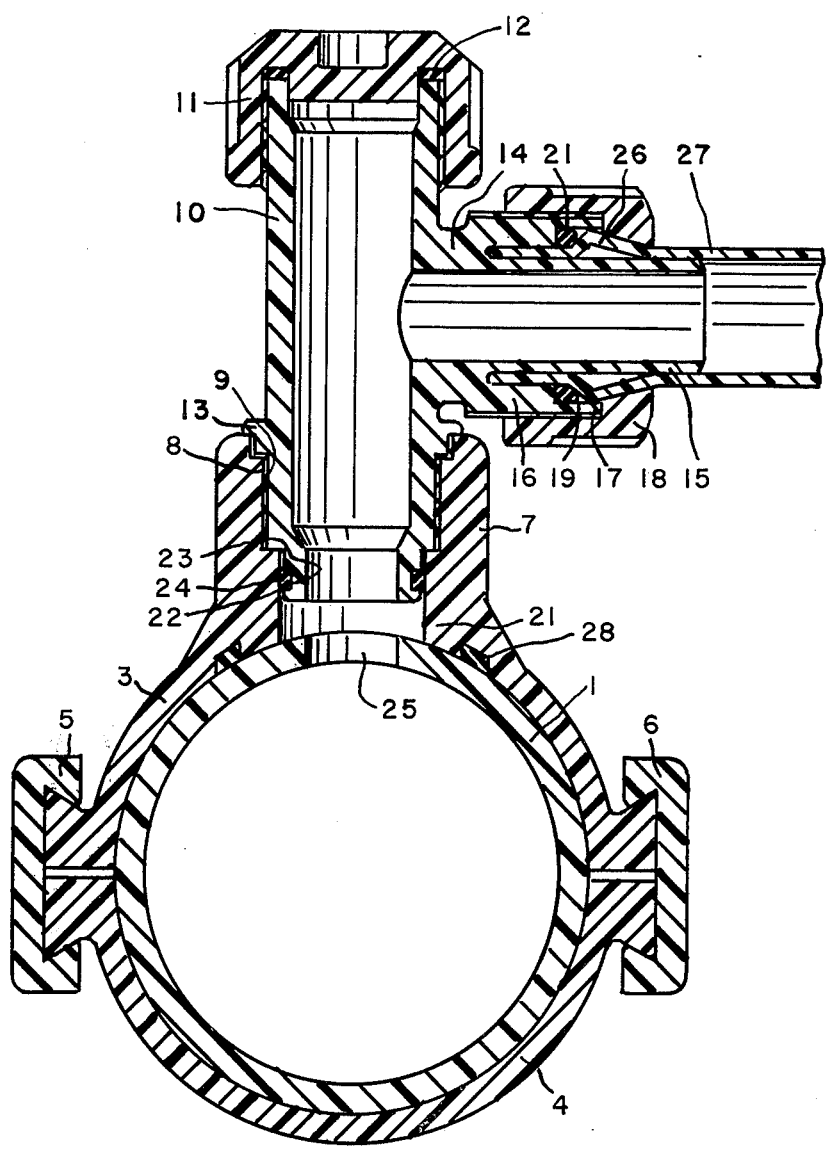

An embodiment of a tapping tee according to the invention will now be described, by way of example, with reference to the accompanying diagrammatic drawings, in which:

FIG. 1 is a cross-sectional view of a tapping tee mounted on a main pipe and connected to a branch pipe made of a flexible synthetic resin material, and FIG. 2 is a cross-sectional view of a tapping tee and of part of a branch pipe formed with a wedge-shaped widened portion.

Referring now to FIG. 1, a tapping tee shown in cross-section and serving to connect a main pipe 1 to a branch pipe part 2 made of polyethylene comprises saddle-shaped parts 3 and 4 which by means of closure members or clamps 5 and 6 are clamped around the pipe 1. Part 3 is sealed to the pipe by any well-known means, such as a sealing member 28. A tubular body 7 is integral with the saddle-shaped part 3. It is internally provided with a screw thread 8 which cooperates with a screw thread 9 formed on the outer wall of a tubular tapping member 10. At the end remote from the main pipe 1 the tapping member 10 is closed by a closure cap 11 and an associated sealing member in the form of an elastically compressible ring 12. The tapping member 10 has a circumferential collar 13 which protects the screwed connection by means of the screw threads 8 and 9 against ingress of soil particles. The tapping member 10 carries a branch-receiving socket 14 which is integrally joined to a support pipe 15 and a sleeve 16. The sleeve 16 is externally provided with a screw thread 17 which cooperates with screw thread of a nut 18. The end of the sleeve 16 has an enlarged bore 19. The bore 19 has a length and a diameter sufficient to receive a wedge ring 20 for at least part of its axial length, which ring is mounted on the branch pipe. The bore 19 further accommodates an O-ring 21 made of an elastically compressible material (synthetic rubber), the inner wall of the bore 19 serving as a sealing surface.

In the embodiment shown the branch pipe 2 is made of polyethylene and extends at right angles to the main pipe. The end of the tubular tapping member 10 facing the pipe 1 is formed with a recess 23 in which a sealing ring 24 made of an elastically compressible material is accommodated. The sealing ring 24 cooperates with a sealing surface 22 on the opposite wall of the tubular tapping member. The portion of the branch pipe 2 which is located in the space between the support pipe 15 and the sleeve 16 and comprises the part of the branch pipe 2 which cooperates with the sealing ring 21 and the wedge ring 20, cannot be deformed because it is enclosed in the said space. When the tapping tee is to be mounted on the main pipe 1, first the saddle-shaped parts 3 and 4 are secured by means of the clamps 5 and 6. Then the tapping member 10 is screwed into the tubular body 7 and the branch pipe 2 is coupled to the branch-receiving socket 14 by means of the wedge ring 20 and the nut 18. Through the end of the tubular tapping member 10 more remote from the main pipe 1 an opening 25 is cut in the main pipe 1 by means of a suitable tapping tool (not shown), after which the tapping member 10 is closed with the cap 11.

FIG. 2 shows a branch pipe portion 27 which at the end is formed with a wedge-shaped widened part 26. This construction can be used for branch pipes made of less flexible synthetic resin materials, such as polyvinyl chloride. The wedge-shaped widened part 26 takes over the function of the wedge ring 20 shown in FIG. 1. The remaining reference numerals in this Figure have the same meanings as in FIG. 1. In practice the branch pipe will have a bend in the proximity of the tapping tee and the branch-receiving socket 14 will extend parallel to the main pipe 1. Vertical displacements can then be taken up by rotation of the branch pipe portion in the sleeve 16, for which purpose the wedge-shaped widened part 26 is enclosed by the nut 18 with a certain amount of clearance.

What is claimed is:
1. Tapping tee for connecting a main pipe to a branch pipe, comprising a saddle-shaped part and a tubular tapping member which is rotatable about an axis at right angles to the main pipe and is provided with a branch-receiving socket for coupling to a branch pipe having a given inner diameter and a given outer diameter, characterized in that the branch-receiving socket of the tubular tapping member has integral coupling parts which comprise a support pipe having an outer diameter which corresponds to said given inner diameter and a sleeve which is arranged coaxially with the support pipe, the inner diameter of at least a portion of the sleeve corresponding to the outer diameter of the branch pipe, the sleeve having an outer surface provided with a screw thread for mounting a nut, a distal end of the sleeve having an enlarged bore having a diameter and a length sufficient to accommodate at least part of a wedge-shaped retainer on a branch pipe to be coupled.

2. Tapping fee as claimed in claim 1, characterized in that the enlarged bore of the sleeve accommodates a sealing member made of an elastically compressible material, the length of the widened part being sufficient to accommodate the sealing member and at least part of the wedge-shaped retainer on the branch pipe.

* * * * *